United States Patent [19]

Miller

[11] E Re. 28,664

[45] Reissued Dec. 23, 1975

[54] SINGLE MATERIAL OPTICAL FIBER STRUCTURES INCLUDING THIN FILM SUPPORTING MEMBERS

[75] Inventor: Stewart Edward Miller, Locust, N.J.

[73] Assignee: Bell Telephone Laboratories, Incorporated, Murray Hill, N.J.

[22] Filed: Feb. 3, 1975

[21] Appl. No.: 546,293

Related U.S. Patent Documents

Reissue of:

[64] Patent No.: 3,813,141
Issued: May 28, 1974
Appl. No.: 308,833
Filed: Nov. 22, 1972

[52] U.S. Cl. ..... 350/96 WG; 65/DIG. 7; 350/96 R
[51] Int. Cl.[2] ..... G02B 5/14
[58] Field of Search ..... 350/96 WG, 96 R

[56] References Cited

UNITED STATES PATENTS

| | | | |
|---|---|---|---|
| 3,318,651 | 5/1967 | Karbowiak | 350/96 WG |
| 3,350,654 | 10/1967 | Snitzer | 329/144 |
| 3,391,969 | 7/1968 | Ogle | 350/96 B |
| 3,434,774 | 3/1969 | Miller | 350/96 WG |
| 3,535,017 | 10/1970 | Miller | 350/96 WG |
| 3,537,020 | 10/1970 | Anderson | 330/4.5 |
| 3,653,739 | 4/1972 | Strack | 350/96 B |
| 3,712,705 | 1/1973 | Marcatili | 350/96 WG |

FOREIGN PATENTS OR APPLICATIONS

| | | | |
|---|---|---|---|
| 2,005,570 | 8/1971 | Germany | 350/96 WG |

*Primary Examiner*—John K. Corbin
*Attorney, Agent, or Firm*—Thomas C. O'Konski

[57] ABSTRACT

Optical fibers, for propagating optical radiation in guided modes, are fabricated in an integral structure. Advantageously, the fiber structure is made of a single filamentary material, such as fused silica, with a relatively large cross section at the central portion of the fiber and with a relatively thin film portion at the extremities of the fiber. The thin film portion *has a thickness larger than the wavelength of the optical radiation to be propagated and* serves as a supporting member for the central portion of the fiber. Such optical fiber structures are capable of propagating either single mode or multimode guided optical waves. In addition, the exposed surface of the central portion (which is not contacted by the thin film supporting member portion) can be contacted with an optically nonlinear material, in order to provide suitable interactions with the propagating signal wave energy and thereby to produce electrooptic effects such as amplification, modulation, or laser action.

10 Claims, 5 Drawing Figures

SINGLE MATERIAL OPTICAL FIBER STRUCTURES INCLUDING THIN FILM SUPPORTING MEMBERS

Matter enclosed in heavy brackets [ ] appears in the original patent but forms no part of this reissue specification; matter printed in italics indicates the additions made by reissue.

FIELD OF THE INVENTION

This invention relates to the field of optical communications systems and, more particularly, to optical fiber structures for the propagation of electromagnetic wave enenrgy.

BACKGROUND OF THE INVENTION

In the prior art, optical waveguides in the form of optical fibers have been utilized for the propagation of optical wave energy in a single mode or in multimodes from one location to another. A basic problem arises in these optical fibers in connection with the attachment of supporting members which are required for mechanical support uniformly along the whole length of the optical fibers. In particular, at the juncture of the supporting member with the optical fiber, an optical disturbance or perturbation is introduced in the modes of wave energy being transmitted through the fiber. This perturbation causes various problems in the propagation of the electromagnetic signal wave energy, such as the unwarranted conversion of signal energy from one mode to another mode with consequent distortion problems. Another problem arises from the need for "cladding" material surrounding the central core of optical fibers, in order to keep foreign materials (such as dust) from contacting the central core and thereby causing further undesired perturbations of the optical modes propagating through the core. Such cladding must ordinarily be made of a material having a lower optical refractive index than that of the core. For such desirable core materials as fused silica, it is difficult to find such suitable cladding which has a lower refractive index than the core and, at the same time, presents sufficiently low optical absorption loss to make it commercially attractive. Moreover, ordinarily this "cladding" material obstructs any coating of the optical fiber core with various optical materials which could serve to provide interaction with the signal wave energy propagating through the optical fiber, it would, therefore, be desirable to have available ana optical transmission fiber which is supported in such a way that the cladding of the fiber does not introduce the losses and obstructions of the prior art.

SUMMARY OF THE INVENTION

In accordance with this invention, an optical fiber, together with transparent supporting members, is made in a unitary integral structure, advantageously formed of a single material. The central portion of the fiber is relatively thick, and is joined at two or more edges by thin film supporting members of the same material as that of the central portion. Such a structure can be designed to operate in either single mode or multimode propagation of the optical waves through the fiber. In addition, the exposed periphery of relatively thick central portion can be contacted in whole, or at any desired part, by various linear or nonlinear optical materials, in order to afford linear or nonlinear interaction with the optical wave energy propagating through the fiber. In this way. further mode control can be provided, or various devices such as lasers, amplifiers and modulators can be integrated into the optical fiber structure.

In a particular embodiment of this invention, a fused silica optical fiber is fabricated with a rectangular cross section in the central region together with a pair of thin film fused silica portions contiguous with two opposite surfaces of the rectangular cross section. The thickness of the thin film portions of the optical fiber, which furnish mechanical support for the central portion, is made relatively large compared with the propagating optical wavelength, in order to provide sufficient mechanical strength for supporting the central portion of the optical waveguide fiber. On the other hand, the dimensions of the rectangular cross section of the central portion of the fiber are made larger than the thickness of thin film supporting members, in order that the optical signal wave energy propagating through the overall optical fiber structure is confined to the central portion thereof by reason of waveguiding properties of the structure. The exposed extreme edges of the thin film supporting members are advantageously fused to a fused silica glass cylinder which, in turn, is coated with optically absorbing material. In this way, unwanted "slab guide" modes, which are not exponentially decreasing in intensity in the thin films (going away from the central portion) and which thereby "leak" through the supporting members to these edges, are absorbed by the coating.

Fiber structures of this invention can be fabricated from an original fused silica fiber of geometrically similar but much larger cross section than the final desired structure. The original fiber is cleaned, heated and drawn (stretched) in the longitudinal direction, in order to reduce the dimensions of the original cross section to the desired relatively small final cross section. The exposed portion of the periphery of the central region of the final optical structure can be, if desired, then contacted at various locations, uniformly or (spatially) periodic or nonperiodic, with various optically linear or nonlinear materials. Thereby, these materials can provide suitable linear or nonlinear interaction phenomena along the fiber between the optical wave energy propagating through the central portion of the fiber and the linear or nonlinear material. In this way, the useful electromagnetic signal wave energy propagating through the optical fiber is confined to the central rectangular portion of the fiber; and, at the same time, access for optically linear or nonlinear materials, to interact with the propagating signal wave energy, is afforded in the optical fiber structure of this invention.

BRIEF DESCRIPTION OF DRAWING

This invention together with its features, advantages and objects can be better understood from the following detailed description when read in conjunction with the drawing, in which.

DETAILED DESCRIPTION

Figure 1:
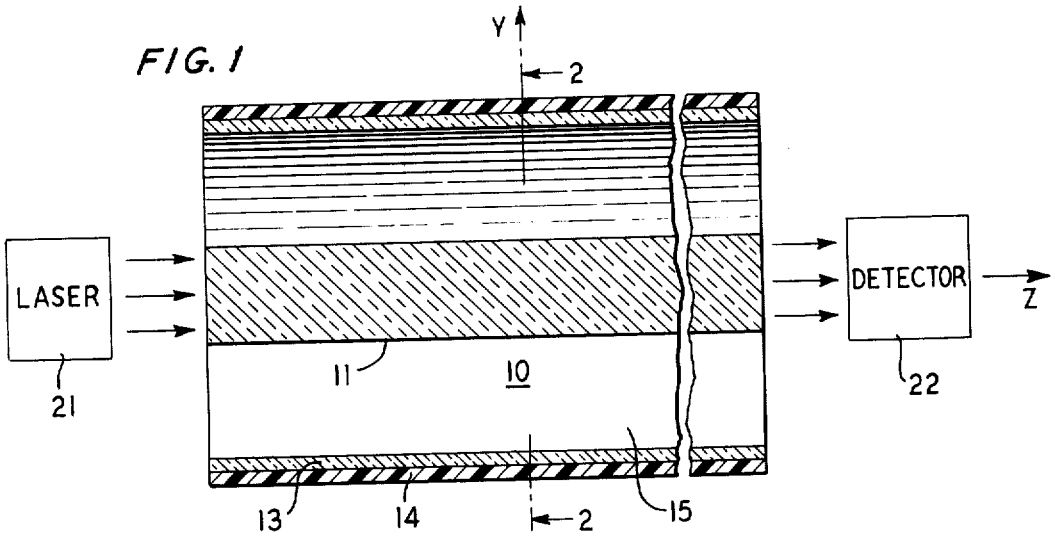
FIG. 1 is a longitudinal diagram, partly in cross section, of an optical fiber structure in accordance with a specific embodiment of the invention.
Figure 2:
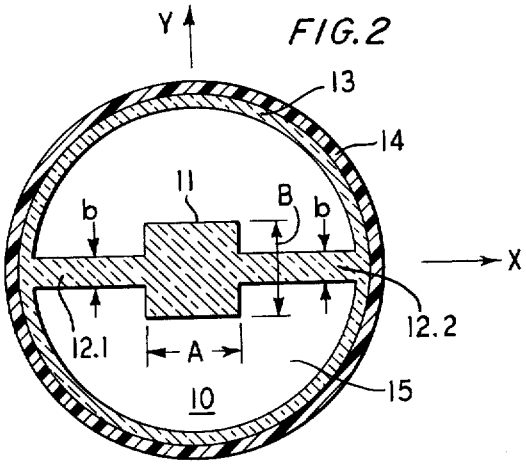
FIG. 2 is a cross-sectional view of the optical fiber structure shown in FIG. 1.

An optical fiber filament structure 10 (FIG. 1) includes a transparent central portion 11, and a pair of supporting transparent thin film portions 12.1 and 12.2 (FIG. 2). The central portion 11 together with the supporting films 12.1 and 12.2 are located in a cavity provided by a peripheral hollow cylindrical portion 13. An optically lossy jacket 14 advantageously encases the cylindrical portion 13. Advantageously, the central portion 11 and the thin films 12.1 and 12.2 are all made of the same optically transmitting material. The peripheral portions 13 typically is likewise made of the same material as the central portions of the thin film supporting members 12.1 and 12.2. An optical source 21 and an optical utilization means 22 are located at opposite longitudinal ends of the optical fiber structure 10 (FIG. ).

If desired for nonlinear optical interaction with the optical waves propagating through the fiber structure 0, the space cavity region 15 between the peripheral portion 13 and the central portion 11 may be filled with an optically nonlinear material, typically a liquid. In the alternative, the entire exposed surface of the central portion 11, or various portions of said surface, may be coated with optically nonlinear material as desired. In this way, the optical wave energy, propagated from the source 21 to the utilization means 22 through the optical fiber structure 10, will advantageously interact with this nonlinear material. In addition or as an alternative, the entire surface, or various portions thereof, of the central portion 11 may be coated with a linear optical material, in order to furnish further waveguiding of the optical wave energy propagating through the central portion 11.

The thickness of the supporting thin films 12.1 and 2.2, indicated by b in FIG. 2, is fabricated advantageously to be larger than the propagating optical wavelength furnished by the source 21, in order to provide mechanical support for the central portion 11. In addition, the width of the supporting thin films 12.1 and 2.2 in the X direction is at least an order of magnitude larger than the wavelength, in order to provide sufficient space for the exponential decrease of the amplitude of the optical modes in direction in the ±X direction going away from the central portion 11. Moreover, it is important that the thickness B of the central portion 11 should be larger than the thickness b of the thin film portions, in order to provide the desired optical waveguiding. In this way the useful modes propagating through the optical structure 10 will be exponentially decreasing with distance in the −X direction in the supporting member 12.1, and also exponentially decreasing in the +X direction in member 12.2 (i.e., in the directions going away from the central portion 11). The other optical modes, which are exponentially increasing or periodic in these respective directions in the supporting members 12.1 and 12.2 ("slab guide modes"), are not useful in this invention; and these "slab guide" modes are quickly absorbed by the optically absorbing material of the outer jacket 14 upon their propagation through the optical fiber 10 in the Z direction.

Figure 3:
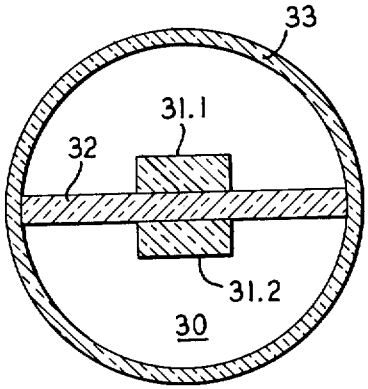
FIG. 3 is a cross-sectional view of the optical fiber structure shown in FIG. 2 in an initial stage of its manufacture.

In order to fabricate the optical fiber structure 10 shown in FIGS. 1 and 2, it is convenient to start with optically polished fiber optic segments 31.1, 31.2, 32 and 33 in the fiber structure 30, as shown in FIG. 3. Typically, all of these segments are made of the same optically transmitting material such asa fused silica. In order to have clean optical surfaces, the exposed surfaces of these segments are cleaned successively with solutions of trichlorethylene, acetone, nitric acid (1:1 diluted with deionized water) and deionized water. Alternatively, the known hot fire flame cleaning technique may be used to clean the surface. Advantageously, the overall cross section of the segments in the structure 30 as initially arranged (FIG. 3) constitutes a geometrically similar, but greatly enlarged, cross section of the finally desired cross section shown in FIG. 2. These segments 31.1, 31.2, 32 and 33 are heated to a temperature sufficient to fuse them together and to enable them to be drawn (stretched) in the longitudinal Z direction, in order to reduce their cross sections to the finally desired value for the optical fiber 10. Thus, it is to be understood that FIG. 3 is not drawn to scale with respect to FIG. 2, but that ordinarily the structure 30 is many times larger in cross section than the structure 10.

It should be understood that the relative values of A, B, and b determine the number of modes which can be guided by the optical fiber structure 10 (substantially independent of optical wavelength). The mode supporting efficiency e of guidance of the optical fiber structure 10 is defined as the ratio of this number of possible guided modes to the number of possible modes which can be guided by a similar optical fiber structure but with b = 0.

EXAMPLE 1

(Multimode Fiber):

An optical fiber structure, with a mode efficiency e of about 10 percent or more, can be afforded by the following choices of parameters. The material for the optical fiber members 11, 12.1, 12.2 and 13 is selected to be of used silica (refractive [inded] *index*, n = 1.46), for propagating optical radiation from the source 21 (wavelength of about one micron) to the optical detector 22. The space 15 is filled with air or vacuum (n = 1.00) and the thickness b is selected to be about 1.4 micron [or less]. For propagating a suitable number of optical modes (multimodes), the dimensions of A and B are typically selected to be at least several times larger than b, but are otherwise arbitrary. For example, A and B can be selected in the range of about 5 to 25 micron. It should be remarked, however, that there is an advantage of using a square cross section (A = B), namely, that splicing is made easier in that the unavoidable minor alignment errors in any splicing procedures are not so crucial as for other cross sections (in which A and B are not equal).

EXAMPLE 2

(Multimode Fiber):

For an optical fiber structure 10 with an optical dispersion of no more than 10 manoseconds per kilometer, the following design can be used. Again, as in Example 1, the optical fibers 11, 12.1 and 12.2 are all made of fused silica (n = 1.46); the space 15 is filled with air or vacuum (n = 1.00); and the optical source 21 provides a beam of radiation having a wavelength of about 1 micron. For this case, b is selected to about 5.4 microns, in order to achieve the desired multimode operation with the desired dispersion. This choice of parameters will then also provide a numerical aperture ("N.A.") of 0.065 radians in the optical fiber structure 10, and a tolerable radius of curvature ("R") of approximately 19 millimeters. By "numerical aperture" is meant the maximum angle of obliqueness in the optical propagation vector which will be radiated from the output end of the fiber, or which will be accepted by the fiber at the input end; and by "tolerable radius of curvature" is meant the minimum radius of curvature for the fiber (going around bends for example) consistent with losses below one percent per centimeter of length. Typically, for optical propagation in a suitable number of multimodes, both A and B are selected to be at least several times larger than b, for example, in the range of about 25 to 50 micron.

Figure 5:
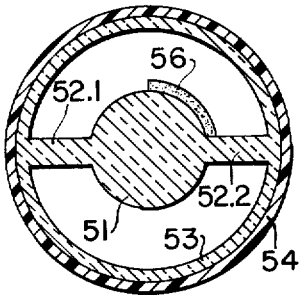
FIG. 5 is a cross-sectional view of an optical fiber structure having a circular central portion, in accordance with yet another specific embodiment of this invention.

In this multimode case (for which b = 5.4 micron) moreover, the cross section of the central portion alternatively can be circular as indicated in FIG. 5, thereby providing a cross section which is easier and less critical for splicing one longitudinal section of the optical fiber with the next adjacent section. The diameter of this central portion 51 can be about 75 micron, and the periphery portion 53 can have an inner diameter of 100 micron and an outer diameter of about 150 micron. Supporting films 52.1 and 52.2, as well as an optically lossy jacket 54, serve the same function as the films 12.1 and 12.2 and the lossy jacket 14 in FIG. 2. A portion of the exposed surface of this central portion can be coated with an optically linear material 56 in order to provide further waveguiding of the optical radiation propagating through the fiber. In addition, or alternatively, a portion of the exposed surface of this central portion can be coated with an optically nonlinear material for interaction with the optical radiation propagating through the fiber.

It should be emphasized that the above Examples 1 and 2 provide multimode optical propagation. For some fiber optical system applications, however, single mode propagation may be desired. In single mode operation, as known in the art, only the fundamental modes (with both polarizations) are propagated by the optical waveguide, which just cuts off for the next ("second") higher order mode. A further desirable, though not necessary, condition for single mode operation is that the thickness b (in the Y direction) is much greater than the wavelength of the fundamental wave energy, just as for multimode operation as described in Examples 1 and 2. The cutoff condition, that is the requirement for single mode, is given by the relation $$\int_{-\frac{A}{2}}^{+\frac{A}{2}} \beta_{x2}(x)dx = \pi \qquad (1)$$

where the quantity $\beta_{x2}$ refers to $\beta_x$ for the "second" order mode, in which $\beta_x$ is zero outside the range $x = \pm A/2$, and in which $\beta_x$ inside this rang is given by the solution of the following simultaneous equations with "unknowns" $\beta_x$, $k_a$, and $k_d$.

$$k^2_a + k^2_d = (\epsilon_r - 1)\beta^2_o \qquad (2)$$

$$\tan(k_d a/2) = \epsilon_r k_a k_d \qquad (3)$$

$$k^2_a = \beta^2_x - \beta^2_o + \beta^2_y. \qquad (4)$$

In Equations (2) – (4), $\lambda_o$ and $\beta_y$ are given by $$\beta_o = 2\pi/\lambda_o \qquad (5)$$

$$\beta_y = \pi 16 \qquad (6)$$

where $\lambda_o$ is the vacuum wavelength of the optical radiation and where $\epsilon_r$ is the corresponding dielectric constant of the optical fiber portion 11 relative to the region 15.

Whereas Equations (2) – (6) apply only to the rectangular cross section in the range $x = \pm A/2$, Equation (1) is perfectly general for any cross section provided the contour in the region $x = \pm A/2$ is sufficiently slowly varying so that substantially no optical reflection occurs whithin this region (except at the extremities). In this general case, the $\beta_{x2}$ in Equation (1) is the transverse wave number of the "second" order mode.

Figure 4:
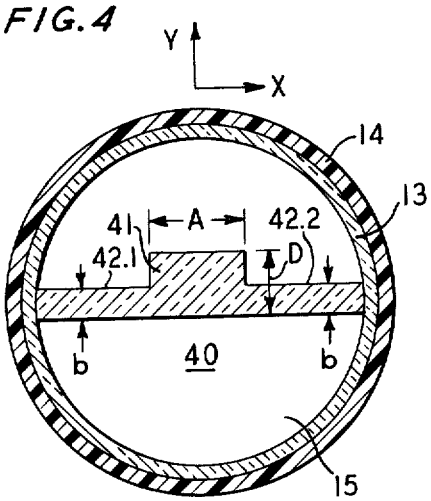
FIG. 4 is a cross-sectional view of an optical fiber structure in accordance with another specific embodiment of the invention.

It should be noted that for single mode operation, asymmetrical configurations (in the y direction) for the optical fibers in this invention are preferred. As illustrated in FIG. 4, an asymmetrical optical fiber 40 is illustrated which can advantageously be produced, as previously indicated in connection with FIG. 3, except that central segment 31.2 is omitted entirely. In the embodiment illustrated in FIG. 4, it should be noted that the bottom surface of the optical fiber 40 is completely planar and has the advantage of fewer intial segments in the fabrication process, as well as the advantage of simpler calculations for predicting the optical modes which can be supported in the fiber. In the optical fiber 40, as finally produced, the central portion 41 has a total thickness in the y direction denoted by D. The central portion is supported by the relatively thin film members 42.1 and 42.2, both of thickness b, on either side thereof, respectively.

EXAMPLE 3

(Single Mode Fiber):

Again assuming that the rectangular optical fiber 40 is selected to be made of fused silica, and that the optical radiation to be propagated therethrough has a wavelength of approximately 1 micron, and selecting a width A which is equal to the thickness D, it follows from Equation (1) that $b = A/\sqrt{2}$, approximately, for the case where b is at least several times greater than the optical wavelength. While this latter condition simplifies the calculation, it is not essential to the invention. In an illustrative case, b is selected to be about 5 micron, with A and D selected to be about 7 micron.

EXAMPLE 4

(Single Mode Fiber):

Referring to FIG. 4, a single-mode, single-material fiber 40 can support propagating optical energy of wavelength approximately 1 micron. In an illustrative case, the thicknesses of the thin portions 42.1 and 42.2 are both about 7 micron, whereas the thickness D of the central portion 41 in the Y direction is about 10 micron. Likewise, the width A in the X direction of the central portion 41 is also about 10 micron. Finally the inner diameter of the periphery portion 43 is about 60 micron, and the outer diameter thereof is about 100 micron.

It should be understood that although the invention has been described in terms of detailed embodiments, various modifications can be made by the worker of ordinary skill in the art without departing from the scope of the invention [x range]. For example, various glass materials, in addition to fused silica, can be used for the transparent materials in the portions 11, 12.1, 12.2 of optical fiber structure 10. These portions need not all be of the same transparent material, so long as they can be fused together. Moreover, to furnish optical interaction wiwth the propagated modes, suitably optically nonlinear material to be placed in contact with the central portion 11 can be selected from such well-known materials as Rhodamine 6-G in water, Rhodamine 6-G in methanol, ethyl alcohol, chlorobenzene, and carbon disulphide. Alternatively, or in addition, optically linear material for cladding the central portion 11 can be selected of known optically linear dielectric materials. Also, the cross section of the central portion of the optical fiber need not be rectangular, but other contours can be used, such as circularly or semicircularly cylindrical, for both single and multimode operation.

Finally, an optical cable, containing many similar optical fibers of this invention, can be fabricated by incorporating these fibers in a single peripheral structure having a circular, elliptical or rectangular cavity for containing these fibers (all of which are joined to the peripheral structure at the tips of the tin film supporting members).

THEORY

Assuming, in the structure shown in FIG. 2, that both A, B and b are all much larger than the propagating optical wavelength, by at least an order of mangitude, the mathematical solution of the optical boundary value problem presented by this cross section shows that the modes which are exponentially decreasing in intensity in the $\pm$ X direction, going away from the central portion, can be supported by the structure. Moreover, in discussing these modes, it is convenient to introduce a quantity V defined as $$V = (\pi\, b/\lambda)\ \sqrt{n^2_c - n^2} \qquad (7)$$

wherein $n_c$ is the common refractive index of the central portion 11 and its members 12.1 and 12, at wavelength $\lambda$ where n is the refractive index of the space 15 contacting the exposed surfaces thereof. In terms of this quantity V, it can be shown that the number of guided modes is equal to N given approximately by (for large numbers thereof only):

$$N = \pi\ AB/2b^2/1 + (\pi/2V)^2 \qquad (8)$$

The mode supporting efficiency e (the ratio of the number of modes guided by this structure to the same structure except with b = 0) is given by $$e = 1/1 + (2V/\pi)^2. \qquad (9)$$

It is further convenient to define quantity $\delta$ as follows:

$$\delta = (e/2)(1 - n^2/n^2_c). \qquad (10)$$

It should be noted that the electromagnetic boundary value problem presented by the structure shown in FIG. 2 can be approximated as a one-dimensional optical fiber problem with a central rectangular slab portion, of refractive index n, contacted at only two opposite sides by rectangular slabs of refracted index $n_e$ and by vacuum on the other two sides in which $$n_e = n(1 - \delta) \qquad (11)$$

and in which $n_c$ is the refractive index of the material in the central portion 11 in FIG. 2. It can be further shown that in terms of this equivalent problem:

$$\delta = n_c - n_e/n_c. \qquad (12)$$

Furthermore, the numerical aperture, ("N.A."), that is, the maximum acceptance angle with respect to the axis of the filament in FIG. 2, at which obliquely directed optical radiation can be propagated through the fiber, is given by:

$$N.A. = n_c\ \sqrt{2\delta}. \qquad (13)$$

Also, for this structure, the tolerable radius of curvature, R (for one percent loss per centimeter), is given by:

$$R = A/2\delta. \qquad (14)$$

And the dispersion, in terms of time delay between lowest and highest order modes per unit longitudinal length of the optical filter, is given by $$T = n_c\delta/c \qquad (15)$$

where c is the speed light in vacuo. The important operating parameters given by Equations (8) through (15) are thus simply calculated in advance, in order to design and obtain the structure's desired operational characteristics.

What is claimed is:

1. An optical fiber structure for waveguiding optical radiation which comprises a filament of a unitary optically transparent structure whose cross section is characterized by a relatively thick [cross section] *cross-sectional* area portion of a fiber optical material at a central portion thereof and by relatively thin cross-sectional area portions of the same material contacting at least two extremities of the central portion, said thin portions *having thicknesses larger than the wavelength of the optical radiation and* providing mechanical support for the central portion, and said thin portions extending in a direction away from the central portion for distances which are at least an order of magnitude larger than the wavelength of the optical radiation, whereby the optical radiation can be propagated in at least one mode through the optical fiber.

2. An optical fiber structure according to claim 1 in which the central portion has a rectangular cross section.

3. An optical fiber structure according to claim 1 in which the central portion has a circular cross section.

4. An optical fiber structure according to claim 1 in which the filament ismade of a single transparent material.

5. An optical fiber structure according to claim 1 in which the exposed edges of the filament, located distally from the central portion, are attached to a peripheral cylindrical hollow second filament which is transparent to the optical radiation.

6. The optical fiber structure recited in claim 5 in which the cylindrical portion is encased in an optically lossy jacket.

7. The optical fiber structure recited in claim 5 in which at least a portion of the space between the peripheral cylindrical portion and the central portion is occupied by an optically nonlinear material for interaction with the optical radiation propagating through the optical fiber.

8. The optical fiber structure recited in claim 1 in which at least a portion of the exposed surface of the central portion is coated with an optical nonlinear material for interaction with the optical radiation propagating through the optical fiber.

9. The optical fiber structure recited in claim 1 in which at least a portion of the exposed surface of the central portion is coated with an optically linear material in order to provide further waveguiding of the optical radiation propagating through the fiber.

10. An optical fiber structure according to claim 1 in which the central portion has a rectangularly shaped cross section, and in which one major surface of each of the thin portions together with the one major surface of the central portion form a single planar surface.

* * * * *